(12) United States Patent
Venugopal et al.

(10) Patent No.: US 11,621,818 B2
(45) Date of Patent: Apr. 4, 2023

(54) TRANSMISSION CONFIGURATION INDICATOR STATE CONFIGURATION

(71) Applicant: QUALCOMM Incorporated, San Diego, CA (US)

(72) Inventors: Kiran Venugopal, Raritan, NJ (US); Yan Zhou, San Diego, CA (US); Tao Luo, San Diego, CA (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 199 days.

(21) Appl. No.: 17/107,436

(22) Filed: Nov. 30, 2020

(65) Prior Publication Data

US 2022/0173862 A1 Jun. 2, 2022

(51) Int. Cl.
| | |
|---|---|
| H04L 5/00 | (2006.01) |
| H04W 72/04 | (2009.01) |
| H04W 72/14 | (2009.01) |
| H04W 72/0446 | (2023.01) |

(52) U.S. Cl.
CPC ......... H04L 5/0051 (2013.01); H04W 72/048 (2013.01); H04W 72/0446 (2013.01)

(58) Field of Classification Search
None
See application file for complete search history.

(56) References Cited

U.S. PATENT DOCUMENTS

| | | | | |
|---|---|---|---|---|
| 2019/0141691 | A1* | 5/2019 | Kwon | H04W 72/12 |
| 2019/0260532 | A1* | 8/2019 | Manolakos | H04L 5/0094 |
| 2019/0342907 | A1* | 11/2019 | Huang | H04L 5/0048 |
| 2021/0184733 | A1* | 6/2021 | Cao | H04B 7/088 |
| 2021/0235452 | A1* | 7/2021 | Huang | H04W 72/0493 |
| 2021/0314953 | A1* | 10/2021 | Park | H04W 72/046 |
| 2021/0391899 | A1* | 12/2021 | Cao | H04B 17/373 |
| 2021/0409098 | A1* | 12/2021 | Matsumura | H04B 7/0834 |
| 2022/0124768 | A1* | 4/2022 | Frenne | H04L 5/0048 |

(Continued)

OTHER PUBLICATIONS

Huawei, et al., "Discussion on Multi-TRP for High Speed Train in Rel-17", 3GPP Draft, RI-2007590, 3GPP TSG RAN WG1 Meeting #103-e, 3rd Generation Partnership Project (3GPP), Mobile Competence Centre, 650, Route Des Lucioles, F-06921 Sophia-Antipolis Cedex, France, vol. RAN WG1, No. E-meeting, Oct. 26, 2020-Nov. 13, 2020, Oct. 24, 2020 (Oct. 24, 2020), XP051946432, 8 Pages, Retrieved from the Internet: URL: https://ftp.3gpp.org/tsg_ran/WG1_RL1/TSGR1_103-e/Docs/R1-2007590.zip R1-2007590.docx [retrieved on Oct. 24, 2020] figure 1 sections 2.1, 2.2.1, 2.2.2.

(Continued)

*Primary Examiner* — Duc T Duong
(74) *Attorney, Agent, or Firm* — Harrity & Harrity, LLP

(57) ABSTRACT

Various aspects of the present disclosure generally relate to wireless communication. In some aspects, a user equipment (UE) may receive information identifying a transmission configuration indicator (TCI) state, wherein the TCI state identifies an association between a periodic demodulation reference signal (DMRS) and a target reference signal. The UE may communicate the periodic DMRS identified by the TCI state. The UE may transmit or receive the target reference signal based at least in part on the periodic DMRS and the TCI state. Numerous other aspects are provided.

28 Claims, 8 Drawing Sheets

(56) References Cited

U.S. PATENT DOCUMENTS

| | | | |
|---|---|---|---|
| 2022/0132549 A1* | 4/2022 | Yu | H04W 72/1289 |
| 2022/0150019 A1* | 5/2022 | Xiao | H04L 5/0053 |
| 2022/0158805 A1* | 5/2022 | Frenne | H04W 72/042 |
| 2022/0256573 A1* | 8/2022 | Frenne | H04W 72/1273 |

OTHER PUBLICATIONS

International Search Report and Written Opinion—PCT/US2021/072612—ISA/EPO—May 25, 2022.

Mediatek Inc: "DL and UL Beam Management", 3GPP Draft, 3GPP TSG RAN WG1 Meeting #90bis, R1-1718333_Beamindication_ULBM_Final, 3rd Generation Partnership Project (3GPP), Mobile Competence Centre, 650, Route Des Lucioles, F-06921 Sophia-Antipolis Cedex, France, vol. RAN WG1, No. Prague, Czechia, Oct. 9, 2017-Oct. 13, 2017, Oct. 3, 2017 (Oct. 3, 2017), XP051352958, XP051341516, 7 Pages, Retrieved from the Internet: URL:http://www.3gpp.org/ftp/tsg_ran/WG1_RL1/TSGR1_90b/Docs/, http://www.3gpp.org/ftp/tsg_ran/WG1_RL1/TSGR1_90b/Docs/ [retrieved on Oct. 3, 2017], sections 2, section 3.2, 2.3.

Nokia, et al., "Remaining Details on Beam Indication, Measurement and Reporting", 3GPP TSG RAN WG1 Meeting AH1-18, R1-1800751,3rd Generation Partnership Project (3GPP), Mobile Competence Centre, 650, Route Des Lucioles, F-06921 Sophia-Antipolis Cedex, France, vol. RAN WG1, No. Vancouver, Canada, Jan. 22, 2018-Jan. 26, 2018, Jan. 13, 2018 (Jan. 13, 2018), XP051385062, pp. 1-7, Retrieved from the Internet: URL: http://www.3gpp.org/ftp/tsg%5Fran/WG1%5FRL1/TSGR1%5FAH/NR%5FAH%5F1801/Docs/, http://www.3gpp.org/ftp/tsg%5Fran/WG1%5FRL1/TSGR1%5FAH/NR%5FAH%5F1801/Docs/, [retrieved on Jan. 13, 2018] sections 2.1.1, 2.1.3.

Partial International Search Report—PCT/US2021/072612—ISA/EPO—Apr. 4, 2022.

Vivo: "Further Discussion and Evaluation on HST-SFN Schemes", 3GPP Draft, R1-2007648, 3GPP TSG RAN WG1 #103-e, 3rd Generation Partnership Project (3GPP), Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946457, 11 Pages, Retrieved from the Internet: URL: https://ftp.3gpp.org/tsg_ran/WG1_RL1/TSGR1_103-e/Docs/R1-2007648.zip R1-2007648 Further discussion and evaluation on HST-SFN schemes.docx [retrieved on Oct. 24, 2020] figure 5, sections 1, 2.4.3.

* cited by examiner

TRANSMISSION CONFIGURATION INDICATOR STATE CONFIGURATION

FIELD OF THE DISCLOSURE

Aspects of the present disclosure generally relate to wireless communication and to techniques and apparatuses for transmission configuration indicator (TCI) state configuration.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the base station to the UE, and the uplink (or reverse link) refers to the communication link from the UE to the base station. As will be described in more detail herein, a base station may be referred to as a Node B, a gNB, an access point (AP), a radio head, a transmit receive point (TRP), a New Radio (NR) base station, a 5G Node B, or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

In some aspects, a method of wireless communication performed by a user equipment (UE) includes receiving information identifying a transmission configuration indicator (TCI) state, wherein the TCI state identifies an association between a periodic demodulation reference signal (DMRS) and a target reference signal; communicating the periodic DMRS identified by the TCI state; and transmitting the target reference signal based at least in part on the periodic DMRS and the TCI state.

In some aspects, a method of wireless communication performed by a UE includes receiving information identifying a TCI state, wherein the TCI state identifies an association between a periodic DMRS and a target reference signal; communicating the periodic DMRS identified by the TCI state; and receiving the target reference signal based at least in part on the periodic DMRS and the TCI state.

In some aspects, a UE for wireless communication includes a memory; and one or more processors operatively coupled to the memory, the memory and the one or more processors configured to: receive information identifying a TCI state, wherein the TCI state identifies an association between a periodic DMRS and a target reference signal; communicate the periodic DMRS identified by the TCI state; and transmit the target reference signal based at least in part on the periodic DMRS and the TCI state.

In some aspects, a UE for wireless communication includes a memory; and one or more processors operatively coupled to the memory, the memory and the one or more processors configured to: receive information identifying a TCI state, wherein the TCI state identifies an association between a periodic DMRS and a target reference signal; communicate the periodic DMRS identified by the TCI state; and receive the target reference signal based at least in part on the periodic DMRS and the TCI state.

In some aspects, a non-transitory computer-readable medium storing a set of instructions for wireless communication includes one or more instructions that, when executed by one or more processors of a UE, cause the UE to: receive information identifying a TCI state, wherein the TCI state identifies an association between a periodic DMRS and a target reference signal; communicate the periodic DMRS identified by the TCI state; and transmit the target reference signal based at least in part on the periodic DMRS and the TCI state.

In some aspects, a non-transitory computer-readable medium storing a set of instructions for wireless communication includes one or more instructions that, when executed by one or more processors of an UE, cause the UE to: receive information identifying a TCI state, wherein the TCI state identifies an association between a periodic DMRS and a target reference signal; communicate the periodic DMRS identified by the TCI state; and receive the target reference signal based at least in part on the periodic DMRS and the TCI state.

In some aspects, an apparatus for wireless communication includes means for receiving information identifying a TCI state, wherein the TCI state identifies an association between a periodic DMRS and a target reference signal; means for communicating the periodic DMRS identified by the TCI state; and means for transmitting the target reference signal based at least in part on the periodic DMRS and the TCI state.

In some aspects, an apparatus for wireless communication includes means for receiving information identifying a TCI state, wherein the TCI state identifies an association between a periodic DMRS and a target reference signal; means for communicating the periodic DMRS identified by the TCI state; and means for receiving the target reference signal based at least in part on the periodic DMRS and the TCI state.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

Figure 1:
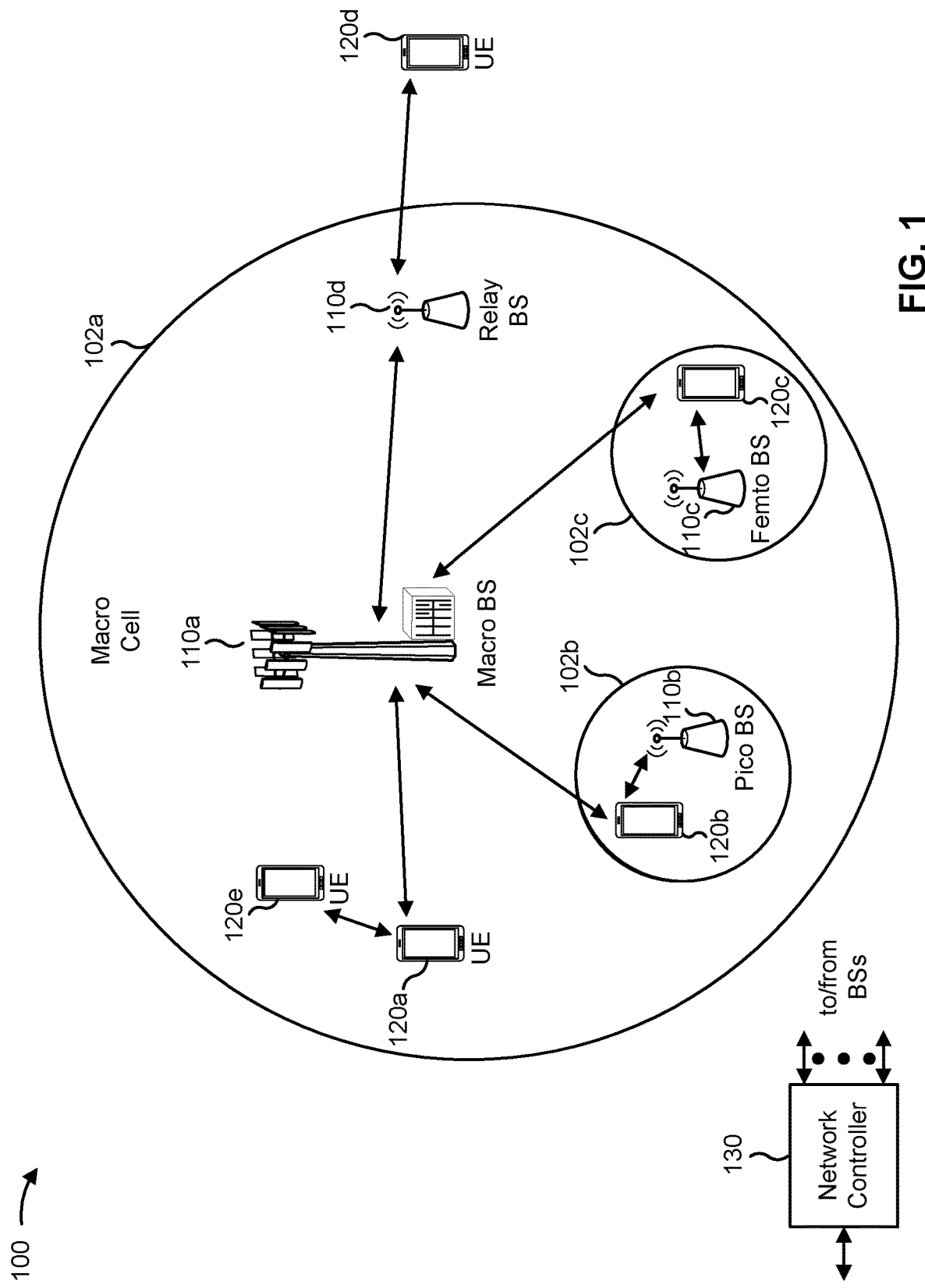
FIG. 1 is a diagram illustrating an example of a wireless network, in accordance with various aspects of the present disclosure.

FIG. 1 is a diagram illustrating an example of a wireless network 100, in accordance with various aspects of the present disclosure. The wireless network 100 may be or may include elements of a 5G (NR) network and/or an LTE network, among other examples. The wireless network 100 may include a number of base stations 110 (shown as base station 110a, base station 110b, base station 110c, and base station 110d) and other network entities. A base station (BS) is an entity that communicates with user equipment (UEs) and may also be referred to as an NR BS, a Node B, a gNB, a 5G node B (NB), an access point, a transmit receive point (TRP), or the like. Each base station may provide communication coverage for a particular geographic area. In 3GPP, the term "cell" can refer to a coverage area of a base station and/or a base station subsystem serving this coverage area, depending on the context in which the term is used.

A base station may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A base station for a macro cell may be referred to as a macro base station. A base station for a pico cell may be referred to as a pico base station. A base station for a femto cell may be referred to as a femto base station or a home base station. In the example shown in FIG. 1, a base station 110a may be a macro base station for a macro cell 102a, a base station 110b may be a pico base station for a pico cell 102b, and a base station 110c may be a femto base station for a femto cell 102c. A base station may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile base station. In some aspects, the base stations may be interconnected to one another and/or to one or more other base stations or network nodes (not shown) in the wireless network 100 through various types of backhaul interfaces, such as a direct physical connection or a virtual network, using any suitable transport network.

Wireless network 100 may also include relay stations. A relay station is an entity that can receive a transmission of data from an upstream station (e.g., a base station or a UE) and send a transmission of the data to a downstream station (e.g., a UE or a base station). A relay station may also be a UE that can relay transmissions for other UEs. In the example shown in FIG. 1, a relay base station 110d may communicate with macro base station 110a and a UE 120d in order to facilitate communication between base station 110a and UE 120d. A relay base station may also be referred to as a relay station, a relay base station, a relay, or the like.

Wireless network 100 may be a heterogeneous network that includes base stations of different types, such as macro base stations, pico base stations, femto base stations, relay base stations, or the like. These different types of base stations may have different transmit power levels, different coverage areas, and different impacts on interference in wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to a set of base stations and may provide coordination and control for these base stations. Network controller 130 may communicate with the base stations via a backhaul. The base stations may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, and/or location tags, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components and/or memory components. In some aspects, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks may be deployed in a given geographic area. Each wireless network may support a particular RAT and may operate on one or more frequencies. A RAT may also be referred to as a radio technology, an air interface, or the like. A frequency may also be referred to as a carrier, a frequency channel, or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol or a vehicle-to-infrastructure (V2I) protocol), and/or a mesh network. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
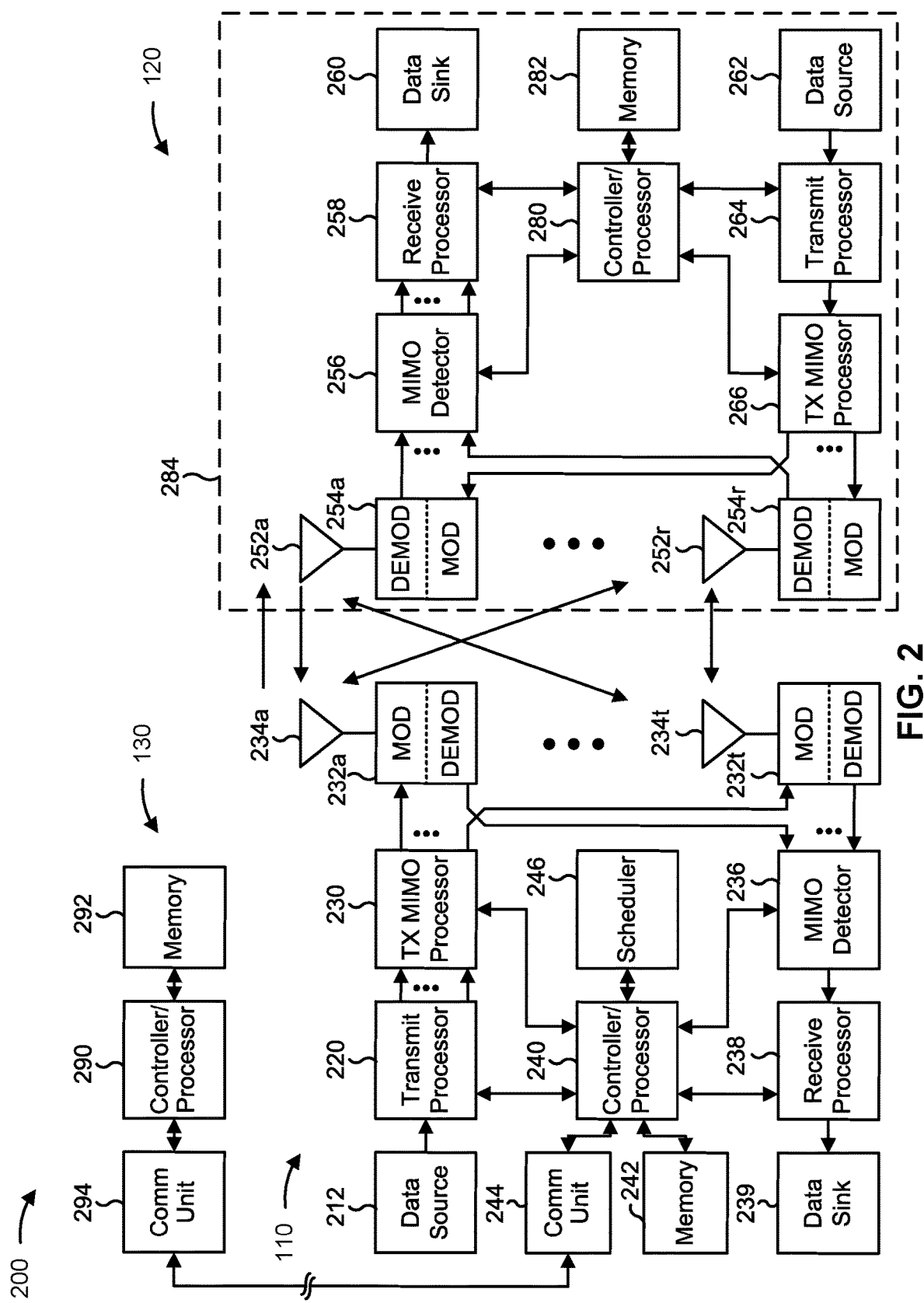
FIG. 2 is a diagram illustrating an example of a base station in communication with a UE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI)) and control information (e.g., CQI requests, grants, and/or upper layer signaling) and provide overhead symbols and control symbols. Transmit processor 220 may also generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a channel quality indicator (CQI) parameter, among other examples. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

Antennas (e.g., antennas 234a through 234t and/or antennas 252a through 252r) may include, or may be included within, one or more antenna panels, antenna groups, sets of antenna elements, and/or antenna arrays, among other examples. An antenna panel, an antenna group, a set of antenna elements, and/or an antenna array may include one or more antenna elements. An antenna panel, an antenna group, a set of antenna elements, and/or an antenna array may include a set of coplanar antenna elements and/or a set of non-coplanar antenna elements. An antenna panel, an antenna group, a set of antenna elements, and/or an antenna array may include antenna elements within a single housing and/or antenna elements within multiple housings. An antenna panel, an antenna group, a set of antenna elements, and/or an antenna array may include one or more antenna elements coupled to one or more transmission and/or reception components, such as one or more components of FIG. 2.

On the uplink, at UE 120, a transmit processor 264 may receive and process data from a data source 262 and control information (e.g., for reports that include RSRP, RSSI, RSRQ, and/or CQI) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM or CP-OFDM), and transmitted to base station 110. In some aspects, a modulator and a demodulator (e.g., MOD/DEMOD 254) of the UE 120 may be included in a modem of the UE 120. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 5-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, a modulator and a demodulator (e.g., MOD/DEMOD 232) of the base station 110 may be included in a modem of the base station 110. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 5-7.

Controller/processor 240 of base station 110, controller/processor 280 of UE 120, and/or any other component(s) of FIG. 2 may perform one or more techniques associated with transmission configuration indicator (TCI) state configuration, as described in more detail elsewhere herein. For example, controller/processor 240 of base station 110, controller/processor 280 of UE 120, and/or any other component(s) of FIG. 2 may perform or direct operations of, for example, process 600 of FIG. 6, process 700 of FIG. 7, and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some aspects, executing instructions may include running the instructions, converting the instructions, compiling the instructions, and/or interpreting the instructions, among other examples.

In some aspects, the UE includes means for receiving information identifying a TCI state, wherein the TCI state identifies an association between a periodic DMRS and a target reference signal; means for communicating the periodic DMRS identified by the TCI state; or means for transmitting the target reference signal based at least in part on the periodic DMRS and the TCI state. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

In some aspects, the UE includes means for receiving a medium access control (MAC) control element (CE) including information updating a quasi-colocation type or reference signal of the TCI state based at least in part on the periodic DMRS.

In some aspects, the UE includes means for configuring one or more other TCI states based at least in part on the TCI state, wherein the one or more other TCI states are associated with a resource group.

In some aspects, the UE includes means for receiving information identifying a TCI state, wherein the TCI state identifies an association between a periodic DMRS and a target reference signal; means for communicating the periodic DMRS identified by the TCI state; or means for receiving the target reference signal based at least in part on the periodic DMRS and the TCI state. The means for the UE to perform operations described herein may include, for example, one or more of antenna 252, demodulator 254, MIMO detector 256, receive processor 258, transmit processor 264, TX MIMO processor 266, modulator 254, controller/processor 280, or memory 282.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

Figure 3:
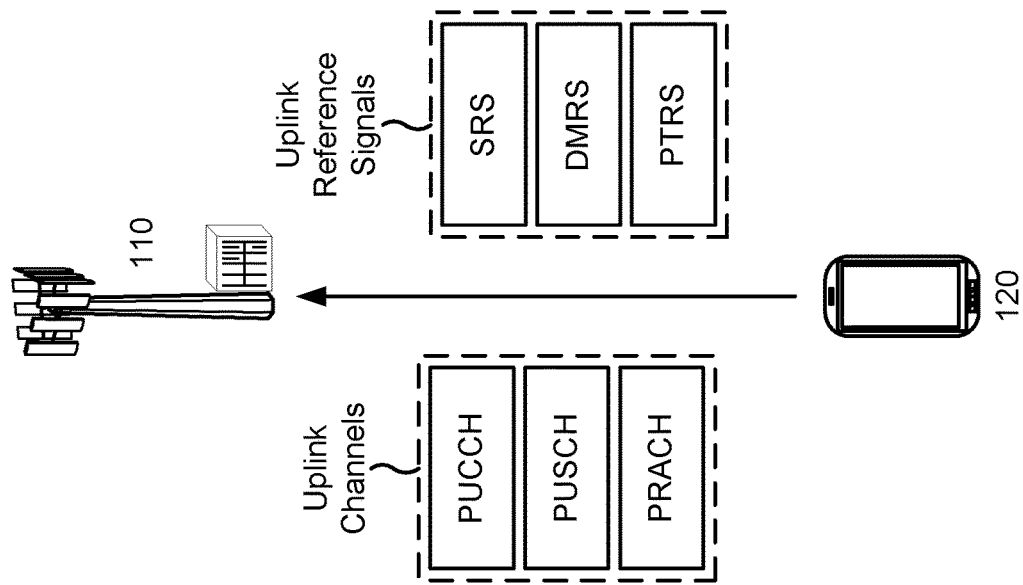
FIG. 3 is a diagram illustrating an example of physical channels and reference signals in a wireless network, in accordance with various aspects of the present disclosure.
Figure 3:
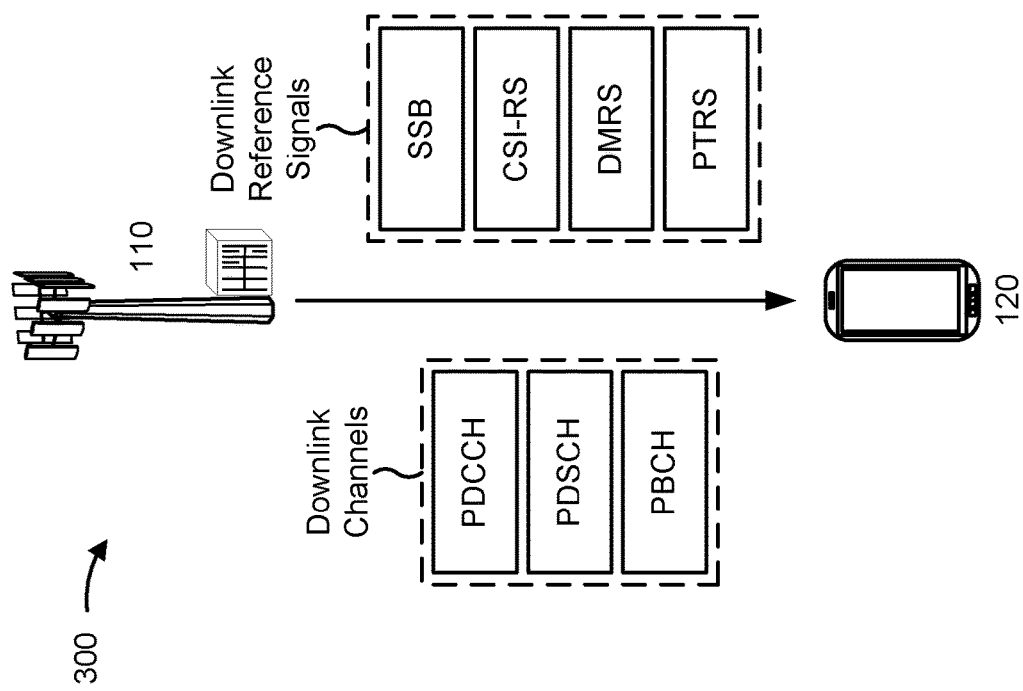

FIG. 3 is a diagram illustrating an example 300 of physical channels and reference signals in a wireless network, in accordance with various aspects of the present disclosure. As shown in FIG. 3, downlink channels and downlink reference signals may carry information from a base station 110 to a UE 120, and uplink channels and uplink reference signals may carry information from a UE 120 to a base station 110.

As shown, a downlink channel may include a physical downlink control channel (PDCCH) that carries downlink control information (DCI), a physical downlink shared channel (PDSCH) that carries downlink data, or a physical broadcast channel (PBCH) that carries system information, among other examples. In some aspects, PDSCH communications may be scheduled by PDCCH communications. As further shown, an uplink channel may include a physical uplink control channel (PUCCH) that carries uplink control information (UCI), a physical uplink shared channel (PUSCH) that carries uplink data, or a physical random access channel (PRACH) used for initial network access, among other examples. In some aspects, the UE 120 may transmit acknowledgement (ACK) or negative acknowledgement (NACK) feedback (e.g., ACK/NACK feedback or ACK/NACK information) in UCI on the PUCCH and/or the PUSCH.

As further shown, a downlink reference signal may include a synchronization signal block (SSB), a channel state information (CSI) reference signal (CSI-RS), a DMRS, a positioning reference signal (PRS), or a phase tracking reference signal (PTRS), among other examples. As also shown, an uplink reference signal may include a sounding reference signal (SRS), a DMRS, or a PTRS, among other examples.

An SSB may carry information used for initial network acquisition and synchronization, such as a primary synchronization signal (PSS), a secondary synchronization signal (SSS), a PBCH, and a PBCH DMRS. An SSB is sometimes referred to as a synchronization signal/PBCH (SS/PBCH) block. In some aspects, the base station 110 may transmit multiple SSBs on multiple corresponding beams, and the SSBs may be used for beam selection.

A CSI-RS may carry information used for downlink channel estimation (e.g., downlink CSI acquisition), which may be used for scheduling, link adaptation, or beam management, among other examples. The base station 110 may configure a set of CSI-RSs for the UE 120, and the UE 120 may measure the configured set of CSI-RSs. Based at least in part on the measurements, the UE 120 may perform channel estimation and may report channel estimation parameters to the base station 110 (e.g., in a CSI report), such as a CQI, a precoding matrix indicator (PMI), a CSI-RS resource indicator (CRI), a layer indicator (LI), a rank indicator (RI), or an RSRP, among other examples. The base station 110 may use the CSI report to select transmission parameters for downlink communications to the UE 120, such as a number of transmission layers (e.g., a rank), a precoding matrix (e.g., a precoder), an MCS, or a refined downlink beam (e.g., using a beam refinement procedure or a beam management procedure), among other examples.

A DMRS may carry information used to estimate a radio channel for demodulation of an associated physical channel (e.g., PDCCH, PDSCH, PBCH, PUCCH, or PUSCH). The design and mapping of a DMRS may be specific to a physical channel for which the DMRS is used for estimation. DMRSs are UE-specific, can be beamformed, can be confined in a scheduled resource (e.g., rather than transmitted on a wideband), and can be transmitted only when necessary.

As shown, DMRSs are used for both downlink communications and uplink communications.

A PTRS may carry information used to compensate for oscillator phase noise. Typically, the phase noise increases as the oscillator carrier frequency increases. Thus, PTRS can be utilized at high carrier frequencies, such as millimeter wave frequencies, to mitigate phase noise. The PTRS may be used to track the phase of the local oscillator and to enable suppression of phase noise and common phase error (CPE). As shown, PTRSs are used for both downlink communications (e.g., on the PDSCH) and uplink communications (e.g., on the PUSCH).

A PRS may carry information used to enable timing or ranging measurements of the UE 120 based on signals transmitted by the base station 110 to improve observed time difference of arrival (OTDOA) positioning performance. For example, a PRS may be a pseudo-random Quadrature Phase Shift Keying (QPSK) sequence mapped in diagonal patterns with shifts in frequency and time to avoid collision with cell-specific reference signals and control channels (e.g., a PDCCH). In general, a PRS may be designed to improve detectability by the UE 120, which may need to detect downlink signals from multiple neighboring base stations in order to perform OTDOA-based positioning. Accordingly, the UE 120 may receive a PRS from multiple cells (e.g., a reference cell and one or more neighbor cells), and may report a reference signal time difference (RSTD) based on OTDOA measurements associated with the PRSs received from the multiple cells. In some aspects, the base station 110 may then calculate a position of the UE 120 based on the RSTD measurements reported by the UE 120.

An SRS may carry information used for uplink channel estimation, which may be used for scheduling, link adaptation, precoder selection, or beam management, among other examples. The base station 110 may configure one or more SRS resource sets for the UE 120, and the UE 120 may transmit SRSs on the configured SRS resource sets. An SRS resource set may have a configured usage, such as uplink CSI acquisition, downlink CSI acquisition for reciprocity-based operations, uplink beam management, among other examples. The base station 110 may measure the SRSs, may perform channel estimation based at least in part on the measurements, and may use the SRS measurements to configure communications with the UE 120.

As indicated above, FIG. 3 is provided as an example. Other examples may differ from what is described with regard to FIG. 3.

Figure 4:
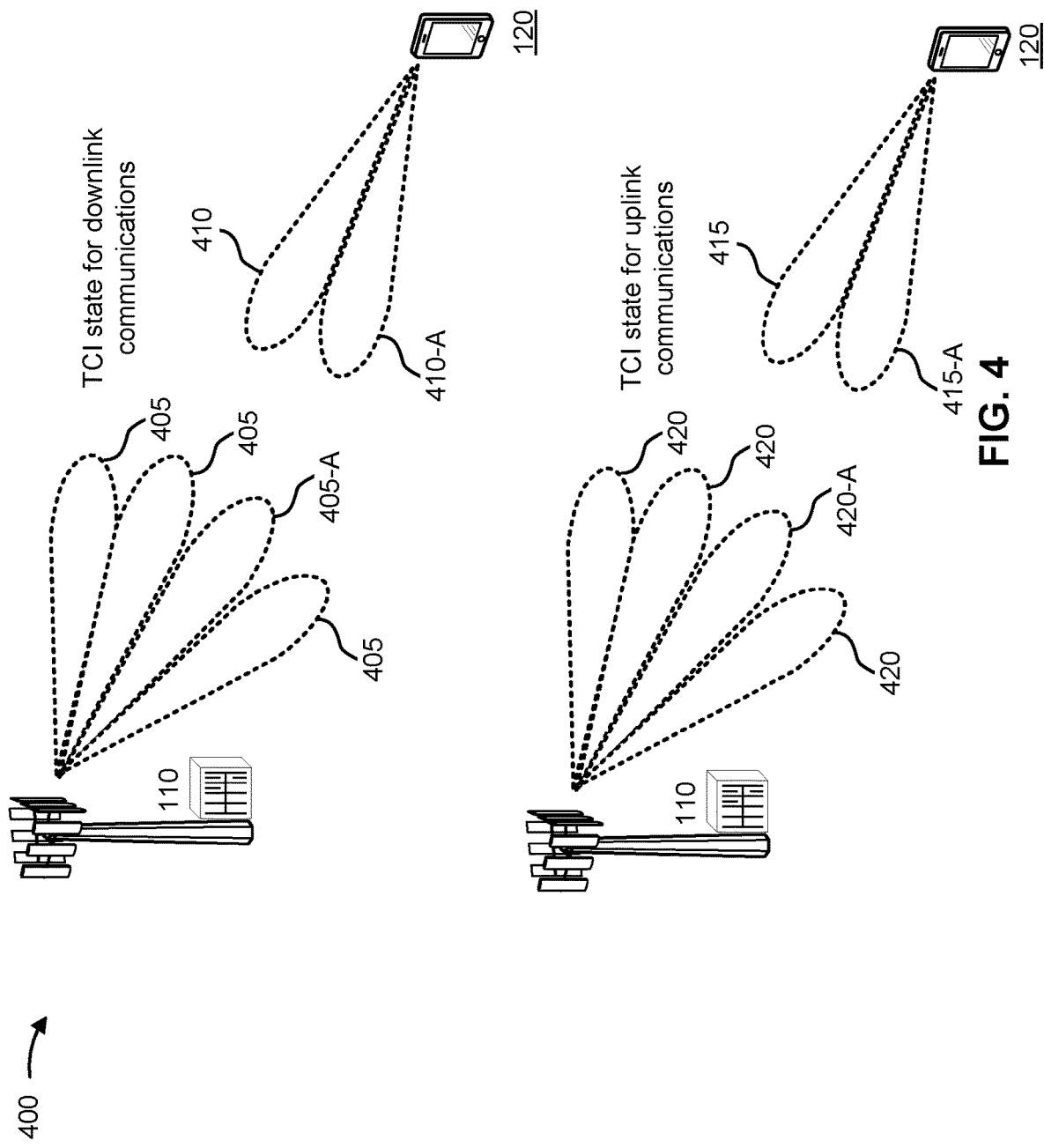
FIG. 4 is a diagram illustrating an example of using beams for communications between a base station and a UE, in accordance with various aspects of the present disclosure.

FIG. 4 is a diagram illustrating an example 400 of using beams for communications between a base station and a UE, in accordance with various aspects of the present disclosure. As shown in FIG. 4, a base station 110 and a UE 120 may communicate with one another.

The base station 110 may transmit to UEs 120 located within a coverage area of the base station 110. The base station 110 and the UE 120 may be configured for beamformed communications, where the base station 110 may transmit in the direction of the UE 120 using a directional base station transmit beam, and the UE 120 may receive the transmission using a directional UE receive beam. Each base station transmit beam may have an associated beam ID, beam direction, or beam symbols, among other examples. The base station 110 may transmit downlink communications via one or more base station transmit beams 405.

The UE 120 may attempt to receive downlink transmissions via one or more UE receive beams 410, which may be configured using different beamforming parameters at receive circuitry of the UE 120. The UE 120 may identify a particular base station transmit beam 405, shown as base station transmit beam 405-A, and a particular UE receive beam 410, shown as UE receive beam 410-A, that provide relatively favorable performance (for example, that have a best channel quality of the different measured combinations of base station transmit beams 405 and UE receive beams 410). In some examples, the UE 120 may transmit an indication of which base station transmit beam 405 is identified by the UE 120 as a preferred base station transmit beam, which the base station 110 may select for transmissions to the UE 120. The UE 120 may thus attain and maintain a beam pair link (BPL) with the base station 110 for downlink communications (for example, a combination of the base station transmit beam 405-A and the UE receive beam 410-A), which may be further refined and maintained in accordance with one or more established beam refinement procedures.

A downlink beam, such as a base station transmit beam 405 or a UE receive beam 410, may be associated with a TCI state. A TCI state may indicate a directionality or a characteristic of the downlink beam, such as one or more quasi-co-location (QCL) properties of the downlink beam. A QCL property may include, for example, a Doppler shift, a Doppler spread, an average delay, a delay spread, or spatial receive parameters, among other examples. In some examples, each base station transmit beam 405 may be associated with an SSB, and the UE 120 may indicate a preferred base station transmit beam 405 by transmitting uplink transmissions in resources of the SSB that are associated with the preferred base station transmit beam 405. A particular SSB may have an associated TCI state (for example, for an antenna port or for beamforming). The base station 110 may, in some examples, indicate a downlink base station transmit beam 405 based at least in part on antenna port QCL properties that may be indicated by the TCI state. A TCI state may be associated with one downlink reference signal set (for example, an SSB and an aperiodic, periodic, or semi-persistent CSI-RS) for different QCL types (for example, QCL types for different combinations of Doppler shift, Doppler spread, average delay, delay spread, or spatial receive parameters, among other examples). In cases where the QCL type indicates spatial receive parameters, the QCL type may correspond to analog receive beamforming parameters of a UE receive beam 410 at the UE 120. Thus, the UE 120 may select a corresponding UE receive beam 410 from a set of BPLs based at least in part on the base station 110 indicating a base station transmit beam 405 via a TCI indication.

The base station 110 may maintain a set of activated TCI states for downlink shared channel transmissions and a set of activated TCI states for downlink control channel transmissions. The set of activated TCI states for downlink shared channel transmissions may correspond to beams that the base station 110 uses for downlink transmission on a PDSCH. The set of activated TCI states for downlink control channel communications may correspond to beams that the base station 110 may use for downlink transmission on a PDCCH or in a control resource set (CORESET). The UE 120 may also maintain a set of activated TCI states for receiving the downlink shared channel transmissions and the CORESET transmissions. If a TCI state is activated for the UE 120, then the UE 120 may have one or more antenna configurations based at least in part on the TCI state, and the UE 120 may not need to reconfigure antennas or antenna weighting configurations. In some examples, the set of activated TCI states (for example, activated PDSCH TCI states and activated CORESET TCI states) for the UE 120 may be configured by a configuration message, such as a radio resource control (RRC) message.

Similarly, for uplink communications, the UE 120 may transmit in the direction of the base station 110 using a directional UE transmit beam, and the base station 110 may receive the transmission using a directional base station receive beam. Each UE transmit beam may have an associated beam ID, beam direction, or beam symbols, among other examples. The UE 120 may transmit uplink communications via one or more UE transmit beams 415.

The base station 110 may receive uplink transmissions via one or more base station receive beams 420. The base station 110 may identify a particular UE transmit beam 415, shown as UE transmit beam 415-A, and a particular base station receive beam 420, shown as base station receive beam 420-A, that provide relatively favorable performance (for example, that have a best channel quality of the different measured combinations of UE transmit beams 415 and base station receive beams 420). In some examples, the base station 110 may transmit an indication of which UE transmit beam 415 is identified by the base station 110 as a preferred UE transmit beam, which the base station 110 may select for transmissions from the UE 120. The UE 120 and the base station 110 may thus attain and maintain a BPL for uplink communications (for example, a combination of the UE transmit beam 415-A and the base station receive beam 420-A), which may be further refined and maintained in accordance with one or more established beam refinement procedures. An uplink beam, such as a UE transmit beam 415 or a base station receive beam 420, may be associated with a TCI state or spatial relation. The TCI state or spatial relation may indicate a directionality or a characteristic of the uplink beam, similar to one or more QCL properties, as described above.

As indicated above, FIG. 4 is provided as an example. Other examples may differ from what is described with respect to FIG. 4.

As described above, a UE may use directional transmissions and receptions to improve communication performance. A UE may receive information selecting a TCI state that associates one or more downlink reference signals (e.g., source reference signals) with a target reference signal. The TCI state may indicate a QCL type. Each QCL type may indicate a set of parameters of the source reference signal that the UE may use to receive the target reference signal, thereby achieving the improved communication performance.

Some examples of QCL types may include QCL Type A (e.g., shared Doppler shift, Doppler spread, average delay, and delay spread between the source and target reference signals), QCL Type B (e.g., shared Doppler shift and Doppler spread between the source and target reference signals), QCL Type C (e.g., shared Doppler shift and average delay between the source and target reference signals), or QCL Type D (e.g., shared spatial receive parameter between the source and target reference signals), among other examples. In this way, by signaling a TCI state and a corresponding QCL type, the base station and the UE ensure that a source reference signal (e.g., an SSB or a CSI-RS) may be used by a UE to receive a target downlink reference signal (e.g., a CSI-RS, a DMRS of a PDCCH, or a DMRS of a PDSCH, among other examples).

TCI state information may also be configured between a reference signal and a target uplink reference signal. For example, a base station may indicate spatial relation information between an SSB, CSI-RS, or SRS, among other examples and a target uplink reference signal. Such spatial relation information may correspond to QCL Type D. In other words, the base station may identify, for the uplink, a shared spatial transmit parameter. Some communications systems propose a joint uplink and downlink TCI framework. However, a DMRS is limited to being a target reference signal in such a framework. A DMRS may provide a narrower and, accordingly, better QCL-type relation for a target reference signal than, in some cases, is achieved using a CSI-RS or SSB as a source reference signal.

Some aspects described herein provide a TCI framework where a TCI state may identify a DMRS to serve as a source reference signal for a target reference signal. For example, the TCI state may include a dedicated identifier defined for a DMRS. Additionally, or alternatively, the TCI state may include a TCI state identifier of a downlink channel, which is associated with a DMRS. Additionally, or alternatively, the TCI state may include a configured grant identifier or semi-persistent scheduling (SPS) identifier, and the configured grant identifier or SPS identifier may indicate a DMRS. In this way, a UE may identify a DMRS to serve as a source reference signal, thereby improving QCL-type relations relative to using a CSI-RS or SSB, which may enable improved communication performance.

Figure 5:
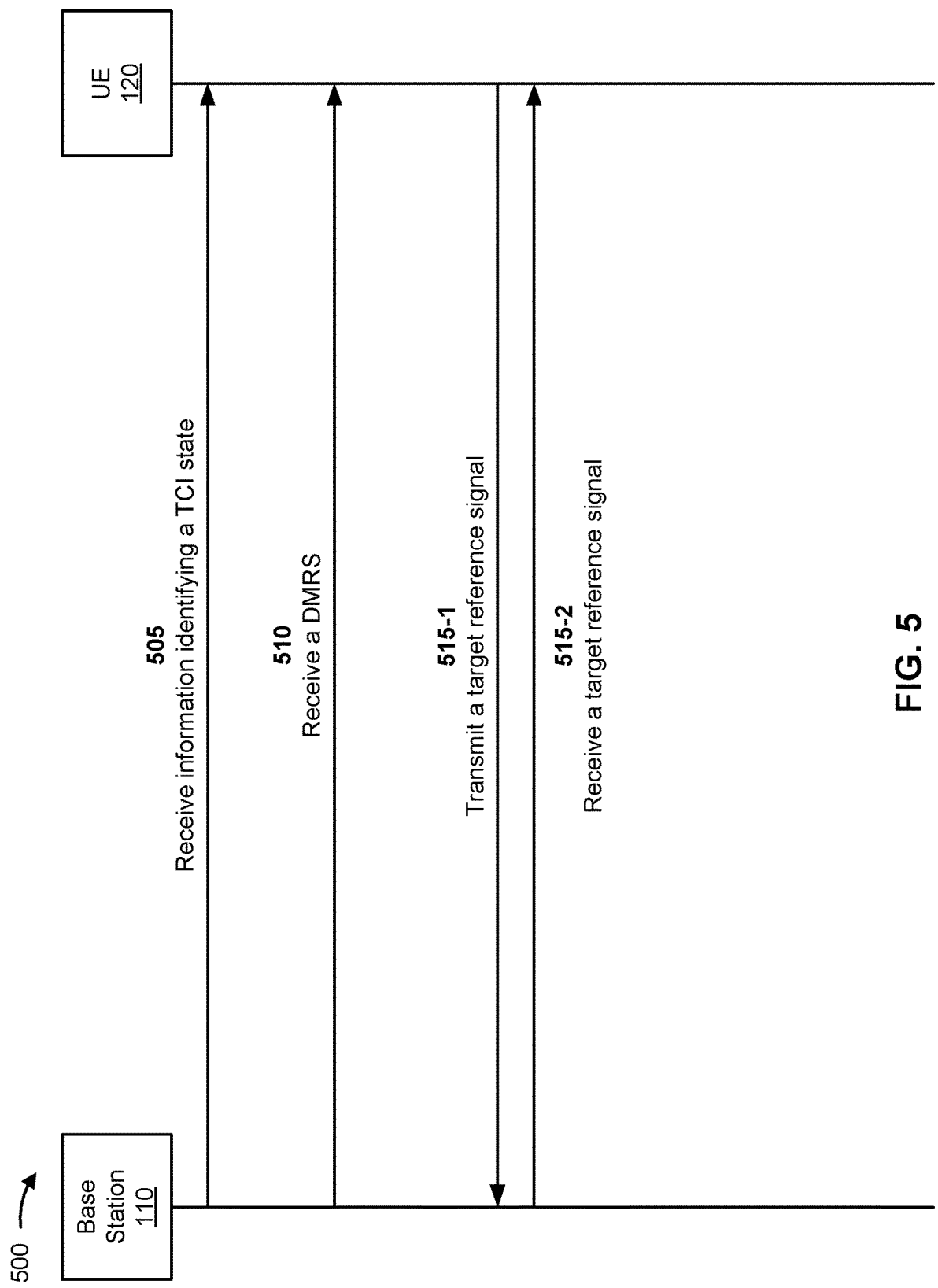
FIG. 5 is a diagram illustrating an example associated with transmission configuration indicator (TCI) state configuration, in accordance with various aspects of the present disclosure.

FIG. 5 is a diagram illustrating an example 500 associated with TCI state configuration, in accordance with various aspects of the present disclosure. As shown in FIG. 5, a base station 110 and a UE 120 may communicate with one another.

As further shown in FIG. 5, and by reference number 505, UE 120 may receive information identifying a TCI state. For example, UE 120 may receive a TCI state message that includes a dedicated identifier, which is defined for conveying an identifier of a DMRS. In this case, the dedicated identifier may identify a periodic DMRS or a particular instance thereof that UE 120 is to use to identify one or more communication parameters for a target reference signal. In some aspects, the TCI state message may include QCL information and the QCL information may include information identifying a selection of a source reference signal. In this case, the selection of the source reference signal may include, in a field reserved for identifying a DMRS, information selecting a periodic DMRS to serve a source reference signal. Additionally, or alternatively, UE 120 may receive a TCI state identifier of a downlink channel from which to derive the DMRS that is to serve as a source reference signal. For example, UE 120 may receive a TCI state identifier corresponding to a PDSCH or PDCCH, which may be associated with a DMRS. In this case, UE 120 may identify the associated DMRS as a source reference signal for a subsequent target reference signal. Additionally, or alternatively, UE 120 may receive a configured grant or SPS configuration identifier. In this case, UE 120 may identify a DMRS based at least in part on the configured grant or the SPS configuration identifier.

As further shown in FIG. 5, and by reference number 510, UE 120 may receive a DMRS. For example, UE 120 may receive an instance of a periodic DMRS that is identified in the TCI state as a source reference signal for a subsequent target reference signal. In this case, UE 120 may identify one or more parameters of the periodic DMRS that UE 120 is to use to transmit or receive an associated target reference signal, such as a subsequent DMRS (e.g., a first DMRS may serve as a target reference signal for a second DMRS), a CSI-RS, an SSB, or an SRS, among other examples. In another example, the periodic DMRS may be an uplink DMRS. In this case, rather than receiving an instance of a periodic DMRS, UE 120 may transmit an instance of the periodic DMRS. Although some aspects are described herein in terms of receiving a periodic DMRS, aspects may also apply to transmitting a periodic DMRS.

In some aspects, the DMRS may serve as a QCL type-D source. In other words, the DMRS may serve as a source for a spatial receive or transmit parameter, rather than another reference signal as is configured for QCL Type-D in accordance with, for example, 3GPP Technical Specification (TS) 38.214 § 5.1.5. For example, UE 120 may use the DMRS as a QCL type-D source, rather than using another QCL Type-A, -B, -C, -D reference signal in one or more TCI states. For example, UE 120 may receive, from base station 110, dynamic signaling (e.g., a medium access control (MAC) control element (CE) (MAC-CE)) that is associated with updating QCL types or reference signals of a TCI state, among other examples, with a new TCI state that uses the DMRS as a QCL Type-D source. In some aspects, UE 120 may identify the new TCI state based at least in part on a dedicated identifier, a TCI state identifier of another TCI state, or a configured grant or SPS configuration identifier, among other examples as described above. Similarly, UE 120 may identify one or more TCI states to which the new TCI state applies based at least in part on a resource grouping configuration.

As further shown in FIG. 5, and by reference numbers 515-1 and 515-2, UE 120 may transmit or receive a target reference signal. For example, using communication parameters shared from the DMRS (e.g., the source reference signal for the target reference signal), UE 120 may transmit the target reference signal to base station 110 or receive the target reference signal from base station 110. In this case, UE 120 may use the shared communication parameters to improve communication performance relative to communication without using shared communication parameters.

As indicated above, FIG. 5 is provided as an example. Other examples may differ from what is described with respect to FIG. 5.

Figure 6:
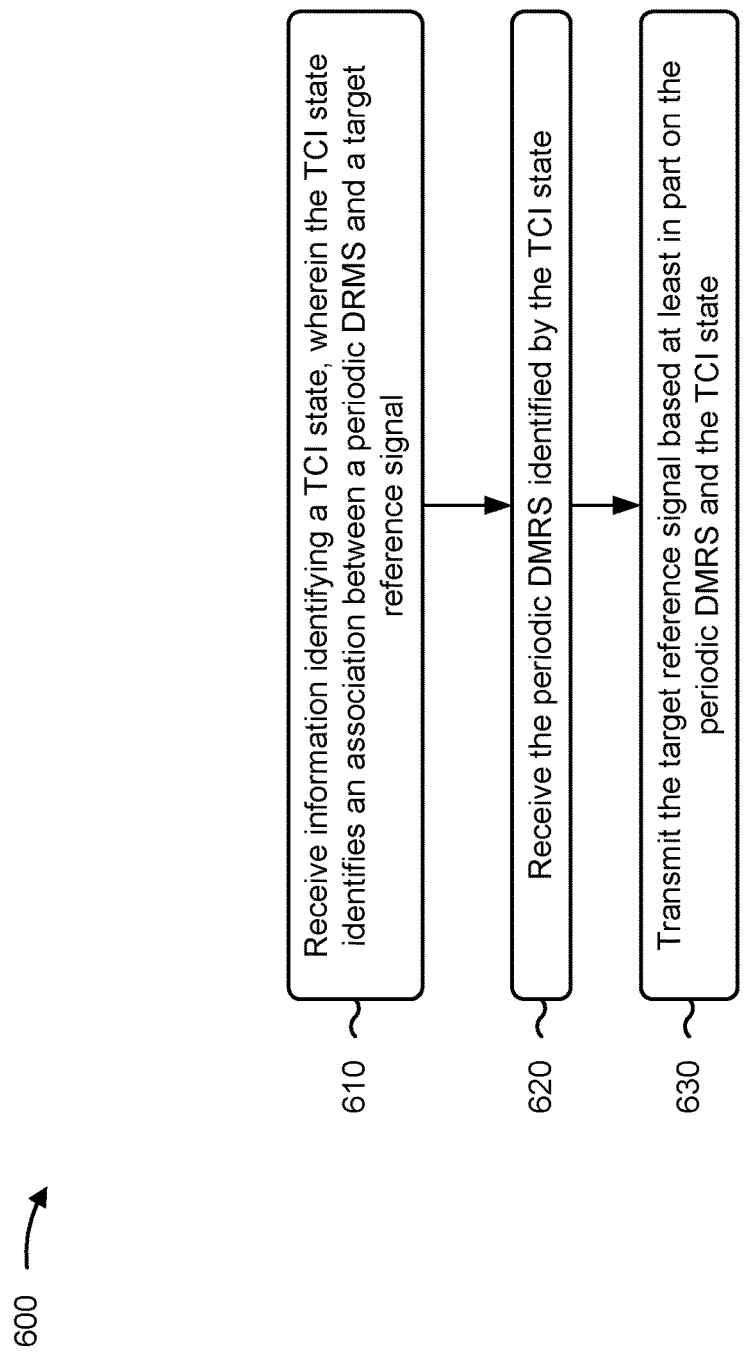
FIGS. 6-7 are diagrams illustrating example processes associated with TCI state configuration, in accordance with various aspects of the present disclosure.

FIG. 6 is a diagram illustrating an example process 600 performed, for example, by a UE, in accordance with various aspects of the present disclosure. Example process 600 is an example where the UE (e.g., UE 120) performs operations associated with transmission configuration indicator.

As shown in FIG. 6, in some aspects, process 600 may include receiving information identifying a TCI state, wherein the TCI state identifies an association between a periodic DMRS and a target reference signal (block 610). For example, the UE (e.g., using reception component 802, depicted in FIG. 8) may receive information identifying a TCI state, wherein the TCI state identifies an association between a periodic DMRS and a target reference signal, as described above.

As further shown in FIG. 6, in some aspects, process 600 may include communicating the periodic DMRS identified by the TCI state (block 620). For example, the UE (e.g., using reception component 802 or transmission component 804, depicted in FIG. 8) may communicate the periodic DMRS identified by the TCI state, as described above.

As further shown in FIG. 6, in some aspects, process 600 may include transmitting the target reference signal based at least in part on the periodic DMRS and the TCI state (block 630). For example, the UE (e.g., using transmission component 804, depicted in FIG. 8) may transmit the target reference signal based at least in part on the periodic DMRS and the TCI state, as described above.

Process 600 may include additional aspects, such as any single aspect or any combination of aspects described below and/or in connection with one or more other processes described elsewhere herein.

In a first aspect, the TCI state includes a dedicated identifier of the periodic DMRS.

In a second aspect, alone or in combination with the first aspect, the TCI state includes a TCI state identifier of a downlink channel, and wherein the downlink channel is associated with the periodic DMRS.

In a third aspect, alone or in combination with one or more of the first and second aspects, the TCI state includes an identifier of a configured grant or semi-persistent scheduling configuration identifier, and wherein the configured grant or the semi-persistent scheduling configuration identifier identifies the periodic DMRS.

In a fourth aspect, alone or in combination with one or more of the first through third aspects, the periodic DMRS is a quasi-colocation type-D source for the TCI state.

In a fifth aspect, alone or in combination with one or more of the first through fourth aspects, receiving information identifying the TCI state comprises receiving a medium access control (MAC) control element (CE) including information updating a quasi-colocation type or reference signal of the TCI state based at least in part on the periodic DMRS.

In a sixth aspect, alone or in combination with one or more of the first through fifth aspects, process 600 includes configuring one or more other TCI states based at least in part on the TCI state, wherein the one or more other TCI states are associated with a resource group.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
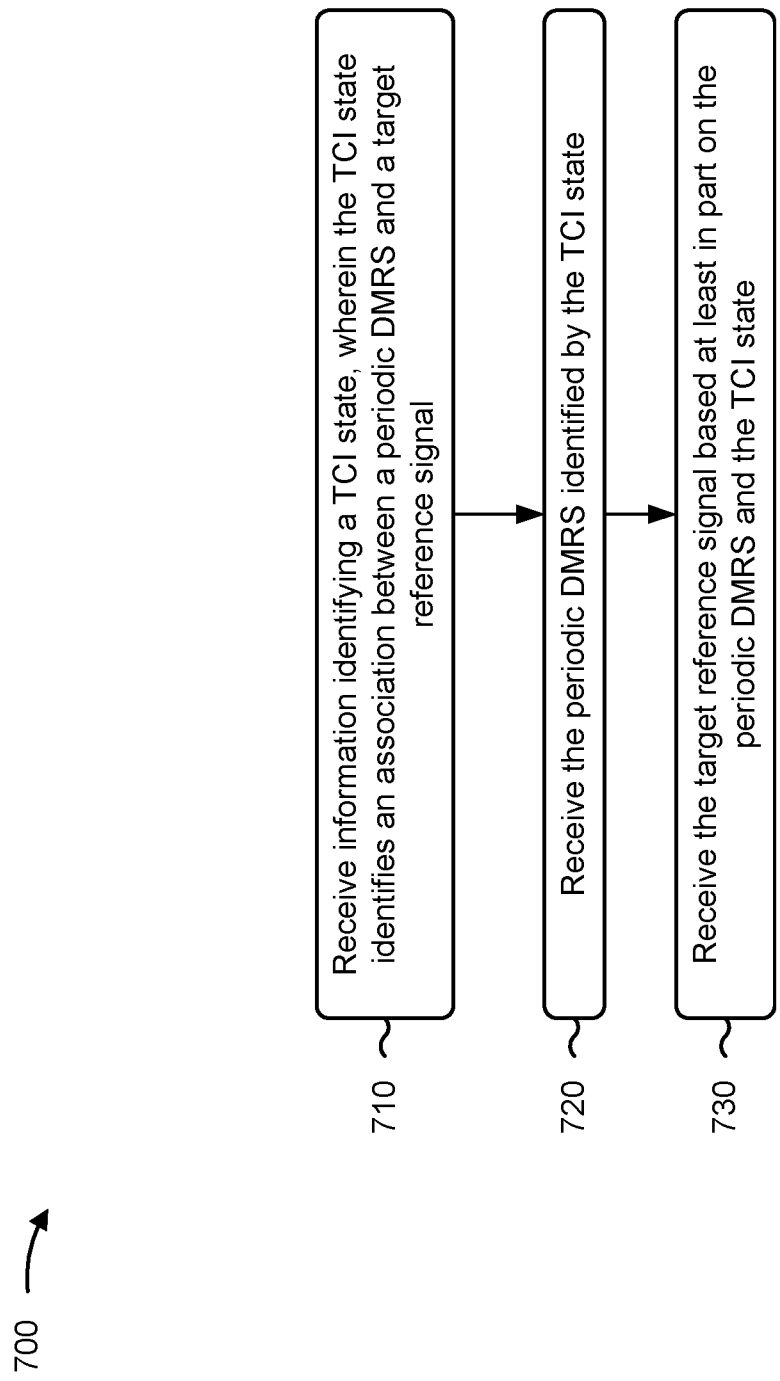

FIG. 7 is a diagram illustrating an example process 700 performed, for example, by an UE, in accordance with various aspects of the present disclosure. Example process 700 is an example where the UE (e.g., UE 120) performs operations associated with transmission configuration indicator.

As shown in FIG. 7, in some aspects, process 700 may include receiving information identifying a TCI state, wherein the TCI state identifies an association between a periodic DMRS and a target reference signal (block 710). For example, the UE (e.g., using reception component 802, depicted in FIG. 8) may receive information identifying a TCI state, wherein the TCI state identifies an association between a periodic DMRS and a target reference signal, as described above.

As further shown in FIG. 7, in some aspects, process 700 may include communicating the periodic DMRS identified by the TCI state (block 720). For example, the UE (e.g., using reception component 802 or transmission component 804, depicted in FIG. 8) may communicate the periodic DMRS identified by the TCI state, as described above.

As further shown in FIG. 7, in some aspects, process 700 may include receiving the target reference signal based at least in part on the periodic DMRS and the TCI state (block 730). For example, the UE (e.g., using reception component 802, depicted in FIG. 8) may receive the target reference signal based at least in part on the periodic DMRS and the TCI state, as described above.

Process 700 may include additional aspects, such as any single aspect or any combination of aspects described below and/or in connection with one or more other processes described elsewhere herein.

In a first aspect, the TCI state includes a dedicated identifier of the periodic DMRS.

In a second aspect, alone or in combination with the first aspect, the TCI state includes a TCI state identifier of a downlink channel, and wherein the downlink channel is associated with the periodic DMRS.

In a third aspect, alone or in combination with one or more of the first and second aspects, the TCI state includes an identifier of a configured grant or semi-persistent scheduling configuration identifier, and wherein the configured grant or the semi-persistent scheduling configuration identifier identifies the periodic DMRS.

In a fourth aspect, alone or in combination with one or more of the first through third aspects, the periodic DMRS is a quasi-colocation type-D source for the TCI state.

In a fifth aspect, alone or in combination with one or more of the first through fourth aspects, receiving information identifying the TCI state comprises receiving a medium access control (MAC) control element (CE) including information updating a quasi-colocation type or reference signal of the TCI state based at least in part on the periodic DMRS.

In a sixth aspect, alone or in combination with one or more of the first through fifth aspects, process 700 includes configuring one or more other TCI states based at least in part on the TCI state, wherein the one or more other TCI states are associated with a resource group.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
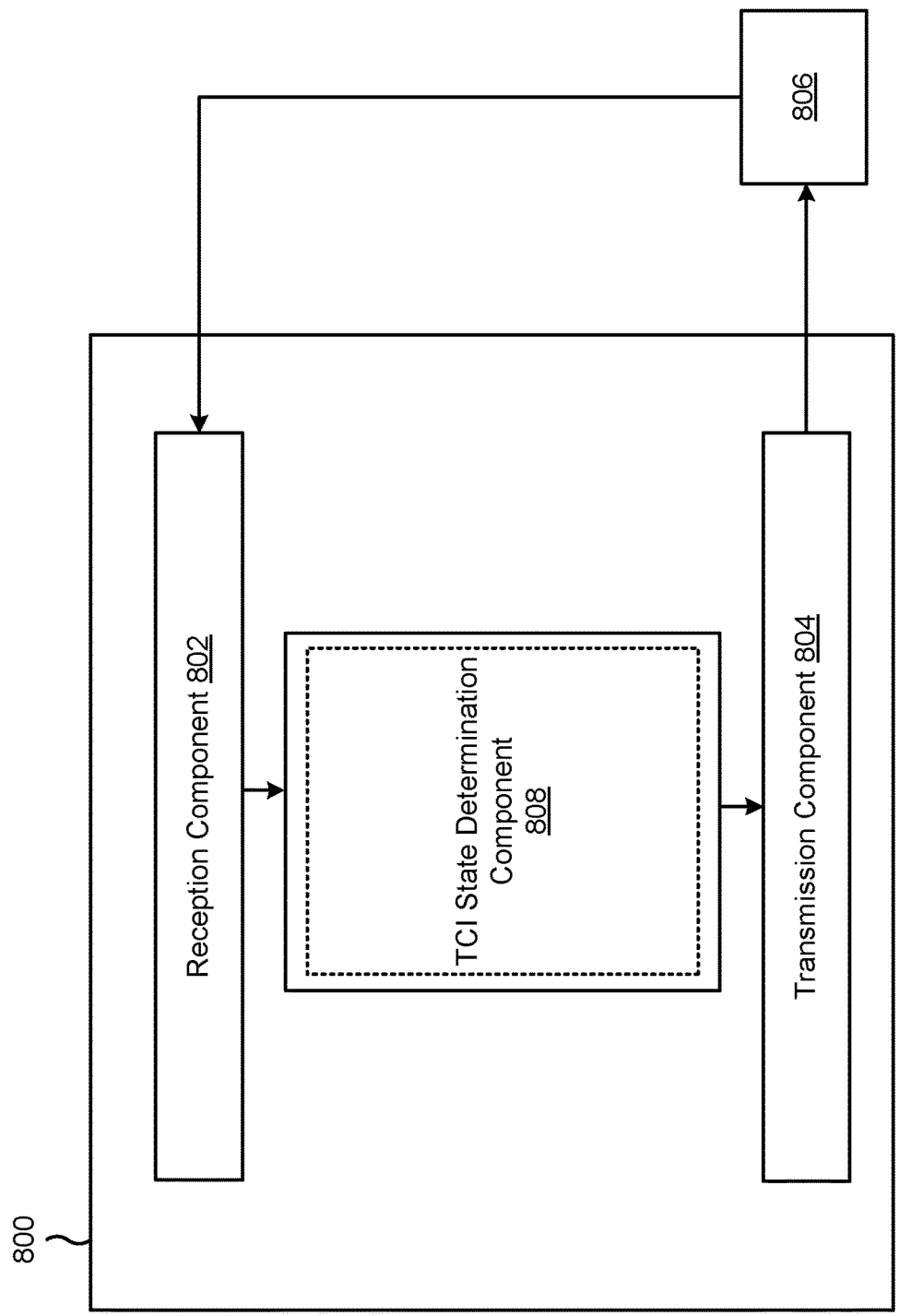
FIG. 8 is a block diagram of an example apparatus for wireless communication, in accordance with various aspects of the present disclosure.

FIG. 8 is a block diagram of an example apparatus 800 for wireless communication. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include a TCI state determination component 808, among other examples.

In some aspects, the apparatus 800 may be configured to perform one or more operations described herein in connection with FIG. 5. Additionally, or alternatively, the apparatus 800 may be configured to perform one or more processes described herein, such as process 600 of FIG. 6, process 700 of FIG. 7, or a combination thereof. In some aspects, the apparatus 800 and/or one or more components shown in FIG. 8 may include one or more components of the UE described above in connection with FIG. 2. Additionally, or alternatively, one or more components shown in FIG. 8 may be implemented within one or more components described above in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 806. In some aspects, the reception component 802 may include one or more antennas, a demodulator, a MIMO detector, a receive processor, a controller/processor, a memory, or a combination thereof, of the UE described above in connection with FIG. 2.

The transmission component 804 may transmit communications, such as reference signals, control information, data communications, or a combination thereof, to the apparatus 806. In some aspects, one or more other components of the apparatus 806 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modulator, a transmit MIMO processor, a transmit processor, a controller/processor, a memory, or a combination thereof, of the UE described above in connection with FIG. 2. In some aspects, the transmission component 804 may be co-located with the reception component 802 in a transceiver.

The reception component 802 may receive information identifying a TCI state, wherein the TCI state identifies an association between a periodic DMRS and a target reference signal. The reception component 802 or transmission component 804 may communicate the periodic DMRS identified by the TCI state. The reception component 802 may receive the target reference signal based at least in part on the periodic DMRS and the TCI state. The transmission component 804 may receive the target reference signal based at least in part on the periodic DMRS and the TCI state. The TCI state determination component 808 may configure one or more other TCI states based at least in part on the TCI state, wherein the one or more other TCI states are associated with a resource group.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

The following provides an overview of aspects of the present disclosure:

Aspect 1: A method of wireless communication performed by a user equipment (UE), comprising: receiving information identifying a transmission configuration indicator (TCI) state, wherein the TCI state identifies an association between a periodic demodulation reference signal (DMRS) and a target reference signal; communicating the periodic DMRS identified by the TCI state; and transmitting the target reference signal based at least in part on the periodic DMRS and the TCI state.

Aspect 2: The method of aspect 1, wherein the TCI state includes a dedicated identifier of the periodic DMRS.

Aspect 3: The method of aspect 1, wherein the TCI state includes a TCI state identifier of a downlink channel, and wherein the downlink channel is associated with the periodic DMRS.

Aspect 4: The method of aspect 1, wherein the TCI state includes an identifier of a configured grant or semi-persistent scheduling configuration identifier, and wherein the configured grant or the semi-persistent scheduling configuration identifier identifies the periodic DMRS.

Aspect 5: The method of any of aspects 1 to 4, wherein the periodic DMRS is a quasi-colocation type-D source for the TCI state.

Aspect 6: The method of aspect 5, wherein receiving information identifying the TCI state comprises: receiving a medium access control (MAC) control element (CE) including information updating a quasi-colocation type or reference signal of the TCI state based at least in part on the periodic DMRS.

Aspect 7: The method of any of aspects 5 to 6, further comprising: configuring one or more other TCI states based at least in part on the TCI state, wherein the one or more other TCI states are associated with a resource group.

Aspect 8: A method of wireless communication performed by a user equipment (UE), comprising: receiving information identifying a transmission configuration indicator (TCI) state, wherein the TCI state identifies an association between a periodic demodulation reference signal (DMRS) and a target reference signal; communicating the periodic DMRS identified by the TCI state; and receiving the target reference signal based at least in part on the periodic DMRS and the TCI state.

Aspect 9: The method of aspect 8, wherein the TCI state includes a dedicated identifier of the periodic DMRS.

Aspect 10: The method of aspect 8, wherein the TCI state includes a TCI state identifier of a downlink channel, and wherein the downlink channel is associated with the periodic DMRS.

Aspect 11: The method of aspect 8, wherein the TCI state includes an identifier of a configured grant or semi-persistent scheduling configuration identifier, and wherein the configured grant or the semi-persistent scheduling configuration identifier identifies the periodic DMRS.

Aspect 12: The method of any of aspects 8 to 11, wherein the periodic DMRS is a quasi-colocation type-D source for the TCI state.

Aspect 13: The method of aspect 12, wherein receiving information identifying the TCI state comprises: receiving a medium access control (MAC) control element (CE) including information updating a quasi-colocation type or reference signal of the TCI state based at least in part on the periodic DMRS.

Aspect 14: The method of any of aspects 12 to 13, further comprising: configuring one or more other TCI states based at least in part on the TCI state, wherein the one or more other TCI states are associated with a resource group.

Aspect 15: An apparatus for wireless communication at a first device, comprising a processor; memory coupled with the processor; and instructions stored in the memory and executable by the processor to cause the apparatus to perform a method of any of aspects 1 to 14.

Aspect 16: A user equipment for wireless communication, comprising a memory and one or more processors coupled to the memory, the memory and the one or more processors configured to perform a method of any of aspects 1 to 14.

Aspect 17: An apparatus for wireless communication, comprising at least one means for performing a method of any of aspects 1 to 14.

Aspect 18: A non-transitory computer-readable medium storing code for wireless communication, the code comprising instructions executable by a processor to perform a method of any of aspects 1 to 14.

Aspect 19: A non-transitory computer-readable medium storing one or more instructions for wireless communication, the one or more instructions comprising one or more instructions that, when executed by one or more processors of a [user equipment/base station], cause the one or more processors to perform a method of any of aspects 1 to 14.

The foregoing disclosure provides illustration and description, but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a processor is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. As used herein, a phrase referring to "at least one of" a list of items refers to any combination of those items, including single members. As an example, "at least one of:

a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:
    receiving information identifying a transmission configuration indicator (TCI) state, wherein:
        the TCI state identifies an association between a periodic demodulation reference signal (DMRS) and a target reference signal,
        the TCI state includes a configured grant identifier or a semi-persistent scheduling identifier, and
        the configured grant identifier or the semi-persistent scheduling identifier identifies the periodic DMRS;
    communicating the periodic DMRS identified by the TCI state; and
    transmitting the target reference signal based at least in part on the periodic DMRS and the TCI state.

2. The method of claim 1, wherein the TCI state includes a dedicated identifier of the periodic DMRS.

3. The method of claim 1, wherein the TCI state includes a TCI state identifier of a downlink channel, and
    wherein the downlink channel is associated with the periodic DMRS.

4. The method of claim 1, wherein the periodic DMRS is a quasi-colocation type-D source for the TCI state.

5. The method of claim 4, wherein receiving information identifying the TCI state comprises:
    receiving a medium access control (MAC) control element (CE) including information updating a quasi-colocation type or reference signal of the TCI state based at least in part on the periodic DMRS.

6. The method of claim 4, further comprising:
    configuring one or more other TCI states based at least in part on the TCI state, wherein the one or more other TCI states are associated with a resource group.

7. The method of claim 1, wherein the target reference signal includes at least one of a subsequent DMRS, a channel state information reference signal (CSI-RS), a synchronization signal block (SSB), or a sounding reference signal (SRS).

8. A method of wireless communication performed by a user equipment (UE), comprising:
    receiving information identifying a transmission configuration indicator (TCI) state, wherein:
        the TCI state identifies an association between a periodic demodulation reference signal (DMRS) and a target reference signal,
        the TCI state includes a configured grant identifier or a semi-persistent scheduling identifier, and
        the configured grant identifier or the semi-persistent scheduling identifier identifies the periodic DMRS;
    communicating the periodic DMRS identified by the TCI state; and
    receiving the target reference signal based at least in part on the periodic DMRS and the TCI state.

9. The method of claim 8, wherein the TCI state includes a dedicated identifier of the periodic DMRS.

10. The method of claim 8, wherein the TCI state includes a TCI state identifier of a downlink channel, and
    wherein the downlink channel is associated with the periodic DMRS.

11. The method of claim 8, wherein the periodic DMRS is a quasi-colocation type-D source for the TCI state.

12. The method of claim 11, wherein receiving information identifying the TCI state comprises:
    receiving a medium access control (MAC) control element (CE) including information updating a quasi-colocation type or reference signal of the TCI state based at least in part on the periodic DMRS.

13. The method of claim 11, further comprising:
    configuring one or more other TCI states based at least in part on the TCI state, wherein the one or more other TCI states are associated with a resource group.

14. The method of claim 8, wherein the target reference signal includes at least one of a subsequent DMRS, a channel state information reference signal (CSI-RS), a synchronization signal block (SSB), or a sounding reference signal (SRS).

15. A user equipment (UE) for wireless communication, comprising:
    a memory; and
    one or more processors operatively coupled to the memory, the one or more processors configured to:
        receive information identifying a transmission configuration indicator (TCI) state, wherein:
            the TCI state identifies an association between a periodic demodulation reference signal (DMRS) and a target reference signal,
            the TCI state includes a configured grant identifier or a semi-persistent scheduling identifier, and
            the configured grant identifier or the semi-persistent scheduling identifier identifies the periodic DMRS;
        communicate the periodic DMRS identified by the TCI state; and
        transmit the target reference signal based at least in part on the periodic DMRS and the TCI state.

16. The UE of claim 15, wherein the TCI state includes a dedicated identifier of the periodic DMRS.

17. The UE of claim 15, wherein the TCI state includes a TCI state identifier of a downlink channel, and
    wherein the downlink channel is associated with the periodic DMRS.

18. The UE of claim 15, wherein the periodic DMRS is a quasi-colocation type-D source for the TCI state.

19. The UE of claim 18, wherein the one or more processors, when receiving information identifying the TCI state, are configured to:

receive a medium access control (MAC) control element (CE) including information updating a quasi-colocation type or reference signal of the TCI state based at least in part on the periodic DMRS.

20. The UE of claim 18, wherein the one or more processors are further configured to:
configure one or more other TCI states based at least in part on the TCI state, wherein the one or more other TCI states are associated with a resource group.

21. The UE of claim 15, wherein the target reference signal includes at least one of a subsequent DMRS, a channel state information reference signal (CSI-RS), a synchronization signal block (SSB), or a sounding reference signal (SRS).

22. A UE for wireless communication, comprising:
a memory; and
one or more processors coupled to the memory, the one or more processors configured to:
receive information identifying a transmission configuration indicator (TCI) state, wherein:
the TCI state identifies an association between a periodic demodulation reference signal (DMRS) and a target reference signal,
the TCI state includes a configured grant identifier or a semi-persistent scheduling identifier, and
the configured grant identifier or the semi-persistent scheduling identifier identifies the periodic DMRS;
communicate the periodic DMRS identified by the TCI state; and
receive the target reference signal based at least in part on the periodic DMRS and the TCI state.

23. The UE of claim 22, wherein the TCI state includes a dedicated identifier of the periodic DMRS.

24. The UE of claim 22, wherein the TCI state includes a TCI state identifier of a downlink channel, and
wherein the downlink channel is associated with the periodic DMRS.

25. The UE of claim 22, wherein the periodic DMRS is a quasi-colocation type-D source for the TCI state.

26. The UE of claim 25, wherein the one or more processors, when receiving information identifying the TCI state, are configured to:
receive a medium access control (MAC) control element (CE) including information updating a quasi-colocation type or reference signal of the TCI state based at least in part on the periodic DMRS.

27. The UE of claim 25, wherein the one or more processors are further configured to:
configure one or more other TCI states based at least in part on the TCI state, wherein the one or more other TCI states are associated with a resource group.

28. The UE of claim 22, wherein the target reference signal includes at least one of a subsequent DMRS, a channel state information reference signal (CSI-RS), a synchronization signal block (SSB), or a sounding reference signal (SRS).

* * * * *